Figure 1:
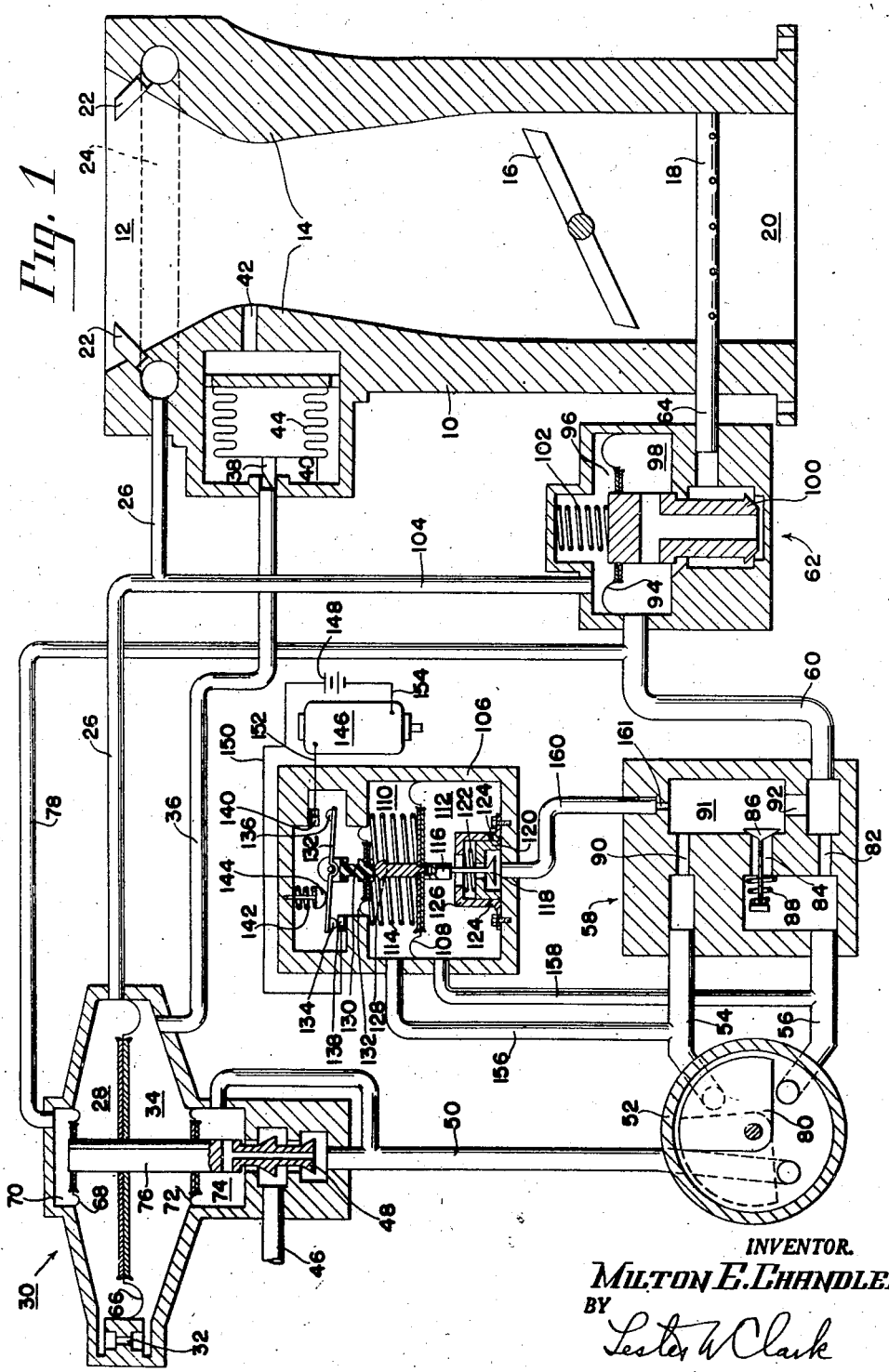

Oct. 5, 1948.   M. E. CHANDLER   2,450,826
CONTROL APPARATUS FOR INTERNAL-COMBUSTION ENGINES
Filed Nov. 16, 1946   2 Sheets-Sheet 1

INVENTOR.
MILTON E. CHANDLER
BY Lester W Clark
AGENT

Oct. 5, 1948.  M. E. CHANDLER  2,450,826
CONTROL APPARATUS FOR INTERNAL-COMBUSTION ENGINES
Filed Nov. 16, 1946  2 Sheets-Sheet 2

INVENTOR.
MILTON E. CHANDLER
BY
Lester W Clark
AGENT

Patented Oct. 5, 1948

2,450,826

UNITED STATES PATENT OFFICE 2,450,826

CONTROL APPARATUS FOR INTERNAL-COMBUSTION ENGINES

Milton E. Chandler, New Britain, Conn., assignor, by mesne assignments, to Niles-Bement-Pond Company, West Hartford, Conn., a corporation of New Jersey Application November 16, 1946, Serial No. 710,295

11 Claims. (Cl. 123—119)

1

This invention relates to control apparatus for internal combustion engines, and particularly to apparatus for controlling the ignition timing, and for coordinating the control of ignition timing with other conditions of engine operation.

The present invention is an improvement on the invention described and claimed in my copending application, Serial No. 491,442, filed June 19, 1943, matured into Patent No. 2,432,283, issued December 9, 1947.

Internal combustion engines run most efficiently, in the intermediate ranges of their power output, with a relatively lean fuel-air ratio and with their ignition timing somewhat advanced. At high power outputs, approaching maximum power output, such a lean fuel-air ratio and advanced ignition timing cause overheating of the engine. It is therefore desirable to provide means for enriching the fuel-air mixture and for retarding the timing from its advanced condition as the engine approaches its maximum power output. Also, at low power outputs, such as are encountered in the "idle range," engines will not run smoothly or will stall if the lean fuel-air ratio and advanced ignition timing are used. It is therefore desirable to provide some means for enriching the fuel-air ratio and retarding the ignition timing in the low power output range. It sometimes happens that, because of unforeseen factors, it is desirable to operate the engine in its intermediate range of engine power output with a rich mixture and retarded ignition timing. It is therefore also desirable to provide a manual control which may be operated to secure such operation at any time.

My copending application above referred to shows apparatus for simultaneously controlling the ignition timing and the fuel-air ratio of an internal combustion engine in order to secure such results.

It is an object of the present invention to improve and simplify such aparatus.

Another object is to provide an improved arrangement of the type described, in which a pressure responsive element which controls the ignition timing also controls the fuel-air ratio.

A further object is to provide, in a system of the type described, an arrangement whereby a pressure responsive control device operates an ignition timing control from normal to advanced and back to normal positions upon a continuous increase in the controlling condition; and wherein the same pressure responsive element operates a fuel-air ratio controlling valve from rich to lean and back to rich positions at the same time that it operates the ignition control.

A further object of the invention is to provide improved electrical switch mechanism which is operable from open to closed to open positions upon a continuous unidirectional movement of a controlling member.

A further object is to provide improved valve mechanism which is operable from open to closed to open positions upon a continuous unidirectional movement of a controlling member.

Figure 2:
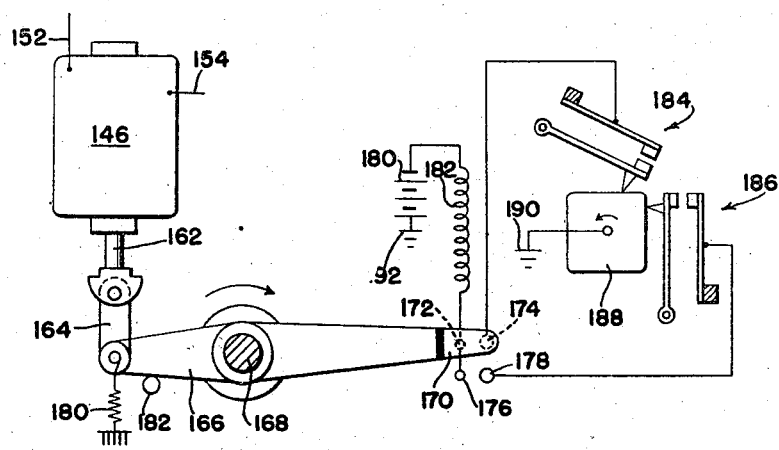
Figure 3:
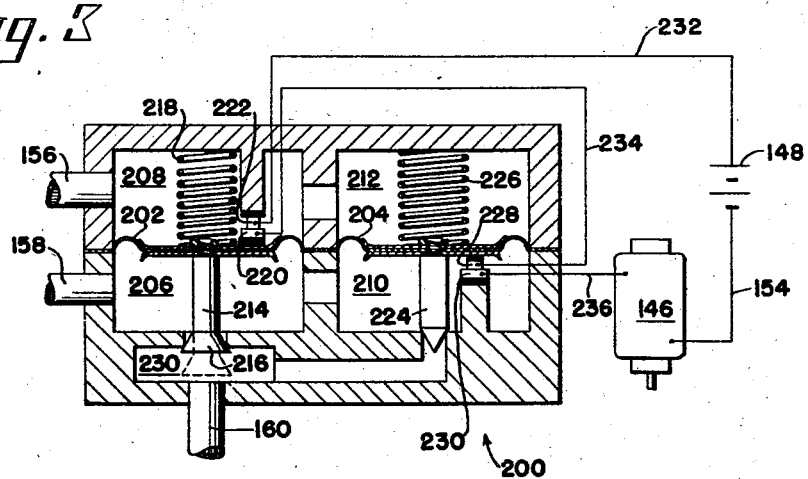

Other objects and advantages of the present invention will become apparent from a consideration of the appended specification, claims, and drawing, in which Figure 1 illustrates, somewhat diagrammatically, a carburetor and ignition timing control system for an internal combustion engine, embodying the principles of my invention, Figure 2 illustrates, somewhat diagrammatically, suitable ignition timing control apparatus which may be used in the system of Figure 1, and Figure 3 illustrates a modified form of ignition timing and fuel-air ratio control apparatus embodying the principles of my invention, which may be substituted for the corresponding structure of Figure 1.

Referring to the drawing, there is shown a section 10 of a carburetor body, through which an air passage extends from an inlet 12, past a venturi 14, a throttle 16, and a fuel nozzle 18 to outlet 20.

The venturi 14 sets up an air pressure differential which is a measure of the volumetric rate of flow of air through the venturi. This pressure differential induces an air flow through a secondary air passage which may be traced from a plurality of impact tubes 22 whose ends are open to receive the impact of the entering air, a connecting passage 24, a conduit 26, a chamber 28 in a fuel meter generally indicated at 30, a fixed restriction 32, a chamber 34, a conduit 36, past a valve 38 into a chamber 40, and through a conduit 42 to the throat of venturi 14. The valve 38 is positioned by a flexible bellows 44. The bellows 44 is sealed, and is preferably partly filled with a fluid having an appreciable temperature coefficient of expansion, so that the valve 38 is positioned in accordance with changes in pressure and temperature in the chamber 40. The function of bellows 44 and valve 38 is to vary the pressure drop across that valve to compensate the pressure drop across restriction 32 for variations in air density, so that the pressure drop across restriction 32 will be a true measure of the mass air flow per unit time thru the venturi. This density compensating effect is more completely described in my prior Patent No. 2,393,144, dated January 15, 1946.

Fuel flows under superatmospheric pressure from a pump or other source (not shown) and passes through a conduit 46, a valve 48 in the fuel meter 30, a conduit 50, a mixture control unit 52, parallel conduits 54 and 56, a jet or metering restriction system 58, a conduit 60, a pressure regulator 62 and a conduit 64 to the fuel nozzle 18.

The fuel meter 30 includes a flexible diaphragm 66 separating the chambers 28 and 34. Another flexible diaphragm 68 separates chamber 28 from a chamber 70. A third flexible diaphragm 72 separates chamber 34 from a chamber 74. The three diaphragms 68, 66 and 72 are attached at their centers to the stem 76 of valve 48.

The chamber 74 is filled with fuel at the pressure existing at the outlet of valve 48, which is substantially the same as the pressure on the upstream side of jet system 58. Chamber 70 is connected through a conduit 78 to the conduit 60 on the downstream side of jet system 58.

The mixture control unit 52 includes a disc valve 80, which is movable between a lean position shown in full lines in the drawing, in which fuel may flow out of the mixture control unit only through conduit 56, and a rich position, shown in dotted lines in the drawing, in which fuel may flow out of the mixture control unit through either of the conduits 54 and 56. The valve 80 is also movable to a position wherein it cuts off the flow through both conduits 54 and 56, known as the cut-off position.

Fuel flowing through conduit 56 to jet system 58 passes either through a fixed restriction 82 or thru a restriction 84 controlled by an enrichment valve 86 biased to closed position by a spring 88. Fuel flowing to jet system 58 through conduit 54 passes through a fixed restriction 90. Fuel flowing through the restrictions 84 and 90 also passes through a fixed restriction 92.

The pressure regulator 62 includes a flexible diphragm 94 separating a pair of expansible chambers 96 and 98. The diaphragm is attached at its center to a valve 100. A spring 102 biases the valve 100 toward closed position. Chamber 98 receives fuel from conduit 60. Chamber 96 is connected through a conduit 104 to conduit 26 and thence to the impact tube 22.

The structure so far described represents more or less conventional carburetor structure. An ignition timing and fuel-air ratio control unit which embodies the novel elements of the present invention is illustrated generally at 106 in the drawings. The unit 106 includes a flexible diaphragm 108 separating a pair of expansible chambers 110 and 112. The diaphragm 108 is biased downwardly by a spring 114. Attached to the center of diaphragm 108 is the stem 116 of a valve 118. The stem 116 passes through an aperture in the web portion of a valve member 120 having the general shape of an inverted cup. The lower edge of this aperture forms a seat for valve 118. The valve member 120 is biased downwardly by a spring 122, so that its lateral walls close a series of ports 124 leading into the chamber 112. The valve member 120 moves in a stationary guide member 126 in which the ports 124 are located.

The diaphragm 108 also carries at its center an abutment member 128 which projects upwardly therefrom and is rounded at its end to provide a rolling surface engagement with another abutment member 130 carried by a diaphragm 132 which seals an opening in the upper wall of chamber 110. The abutment member 130 is provided at its upper end with a yoke portion which pivotally carries a switch lever 132. The lever 132 carries at its opposite ends a pair of movable switch contacts 134 and 136. These contacts are located on opposite sides of the switch lever 132. Contact 134 co-operates with a stationary contact 138, while contact 136 co-operates with a stationary contact 140. A spring 142 is held in compression between the housing of unit 106 and a guided retainer 144. The spring 142 biases the retainer 144 into engagement wtih switch lever 132, and thereby moves contact 134 into engagement with stationary contact 138 and also maintains abutment member 130 in engagement with abutment member 128.

The switch mechanism just described controls an electrical circuit for energizing an electromagnet 146 which operates ignition timing control means such as that illustrated in Figure 2. This electrical circuit may be traced from the upper terminal of a battery 148, through a conductor 150, contacts 138 and 134, switch lever 132, contacts 136 and 140, a conductor 152, electromagnet 146, and a conductor 154 to the lower terminal of battery 148.

Chamber 110 is connected through a conduit 156 to the conduit 54 and chamber 112 is connected through a conduit 158 to the conduit 56. The chamber at the outlet side of valve 118 is connected through a conduit 160 to the chamber 91 in jet system 58.

The ignition control mechanism, as illustrated in Figure 2, includes an armature 162 of the electromagnet 146. Armature 162 is connected through a link 164 to one end of a lever 166, pivotally mounted at 168. The opposite end of lever 168 carries a switch finger 170. Finger 170 is movable between a pair of normal timing contacts 172 and 174, and a pair of advanced timing contacts 176 and 178. A spring 180 biases the lever 166 against a stop 182, so that the finger 170 is in engagement with the normal timing contacts 172 and 174.

The two sets of contacts controlled by finger 170 control selectively two ignition circuits which extend from a battery 180 through a primary ignition coil 182, finger 170, and either a set of normal timing breaker contacts 184 or a set of advanced timing breaker contacts 186, depending upon the position of finger 170. These circuits are completed through the breaker cam 188 and ground connections 190 and 192 to the opposite terminal of the battery.

*Operation of Figures 1 and 2*

The pressure regulator 62 operates to maintain a substantially constant pressure on the downstream side of the jet system 58. The value of this pressure is determined by the force of spring 102. If the pressure in chamber 98 exceeds that determined by the force of spring 102, that pressure, acting upwardly on diaphragm 94, compresses spring 102 further, and opens valve 100 wider until the pressure in chamber 98 is reduced substantially to its previous value. The pressure in chamber 98 is not exactly constant, because of the regulation introduced by spring 102, since an increasing force is required to increasingly compress spring 102 to change the position of valve 100. However, the range of variations in the pressure in chamber 98 may be made small by proper design of diaphragm 94 and spring 102. Some variation in pressure in chamber 98 is also introduced by variations in pressure in chamber 96. This is substantially atmospheric pressure. However, the intended function of regulator 62 is not to maintain an exactly constant pressure on the downstream side of the jet system, but to maintain that pressure within a fairly narrow range of values, which range is substantially above atmospheric pressure, so as to prevent vaporization of the fuel as it passes through the jet. Such vaporization might otherwise produce inaccurate metering of the fuel flow.

The fuel meter 30 regulates the pressure on the upstream side of the jet system so as to maintain the fuel pressure differential across the jet system proportional to the air pressure differential which acts downwardly on diaphragm 66. Since the fuel pressure differential is maintained proportional to the air pressure differential, both of the pressure differentials may be considered to be measures of the air flow. For a given metering restriction area open to the flow of fuel through the jet system, the fuel pressure differential is also a measure of the fuel flow. In the jet system 58, such a variation in the metering restriction area is accomplished in two ways. In the first place, the enrichment valve 86 opens under the influence of the fuel pressure differential when that differential exceeds a value sufficient to overcome the spring 88. There is thus provided an automatic enrichment of the fuel-air mixture at high power outputs. In the second place, by manipulation of valve 80 in the mixture control unit 52, the pilot may select either a lean fuel-air mixture, wherein only the restriction 82 is open to the flow of fuel, or a rich fuel-air mixture, wherein the restriction 90 is also open to the flow of fuel.

In addition to the two controls of the fuel-air ratio mentioned above, the unit 106 controls the flow of fuel through the metering restriction 161 in accordance with the fuel pressure differential across the jet system and in accordance with the position of the manually operated valve 80. When the parts are in the positions shown in the drawing, the valve 80 is in its lean position, and the fuel pressure differential is at a low value, such as would be encountered in the idling range. Under these conditions, fuel may flow from conduit 56, through conduct 158, chamber 112, through the aperture in the center of guide 126, through the aperture in the center of valve member 120, past valve 118 and through conduit 160 and metering restriction 161 and on to the engine.

The pressure in chamber 110 is substantially the same as the pressure on the downstream side of the jet system, since there is no flow through restriction 90 and hence no pressure drop through it. With these conditions existing, let it now be assumed that the power output of the engine is gradually increased, thereby gradually increasing the fuel pressure differential. The contacts 136 and 140 are separated, so that electromagnet 146 is deenergized, and the ignition timing is normal. As the fuel pressure differential increases, then it acts upwardly on diaphragm 108, compressing spring 114. As the diaphragm 108 moves upwardly, a point is reached where valve 118 engages its seat on valve member 120. Simultaneously, the contact 136 engages contact 140.

Engagement of valve member 118 with its seat cuts off the flow of fuel through restriction 161, thereby decreasing the fuel-air ratio. At the same time, engagement of contacts 138 and 140 causes energization of the electromagnet 146 and thereby advances the ignition timing.

Further upward movement of diaphragm 108 cannot take place until the pressure differential increases sufficiently to overcome not only the spring 114, but also the spring 122 and the spring 142. The spring 142 and retainer 144 may be placed, if desired, somewhat to the left of the position shown in the drawing, so that a given upward movement of abutment member 130 requires a greater compression of spring 142 when the lever 132 is pivoting about contact 136 than when the lever is pivoting about contact 134. There is, therefore, a considerable range of values of the fuel pressure differential, during which the increasing fuel pressure differential causes no change in the fuel-air ratio or in the ignition timing. The extent of this range is determined by the relative strength of these springs. This is known as the cruising range, and corresponds with the range of power output over which the engine may operate efficiently with a lean fuel-air ratio and advances ignition timing.

As the fuel pressure differential continues to increase, it eventually becomes strong enough to overcome springs 114, 122 and 142. It then moves valve member 120 upwardly, opening the ports 124 so that fuel may again flow through metering restriction 161. The fuel-air ratio is thereby again increased. At the same time, the continued upward movement of diaphragm 108 causes the switch lever 132 to pivot about the contacts 136 and 140, thereby separating the contacts 134 and 138, and de-energizing the electromagnet 146, so that the ignition timing is returned to its normal condition.

On the decreasing fuel pressure differential, the reserve sequence of operation takes place.

It may, therefore, be seen that I have provided a simplified fuel mixture and ignition timing control arrangement wherein one diaphragm controls both the fuel mixture and the ignition timing, and wherein the fuel mixture is made leaner and the timing advanced over an intermediate range of power outputs, while the mixture is made richer and the timing retarded at either end of said intermediate range.

Whenever the manual mixture control valve 80 is moved to its rich position, the pressures in chambers 110 and 112 are equalized, and the spring 114 moves diaphragm 108 and its associated parts to the positions shown in the drawing, so that the mixture is enriched and the ignition timing is retarded. It is thus possible for the operator to ensure that the mixture and the ignition timing are established at safe values at any point in the entire range of engine power output.

*Figure 3*

I have illustrated in Figure 3 a modified form of mixture and ignition timing control unit, generally indicated at 200, which may be used in place of unit 106 of Figure 1. In Figure 3, those elements which correspond exactly to their counterparts in Figure 1 have been given the same reference characters and will not be further described.

In Figure 3, two diaphragms 202 and 204 are provided to perform the functions performed by the single diaphragm 108 of Figure 1. The diaphragm 202 controls the change from the idle range to the intermediate range of power outputs, while the diaphragm 204 controls the change from the intermediate range to the high power output range.

The diaphragm 202 separates a pair of expansible chambers 206 and 208 which are interconnected, respectively, with another pair of chambers 210 and 212, separated by diaphragm 204. The stem 214 of a valve 216 is attached to the center of diaphragm 202. A spring 218 acts on the diaphragm 202 and biases the valve 216 toward open position. The diaphragm 202 carries a movable contact 220 which co-operates with a stationary contact 222. A valve 224 is attached to the center of diaphragm 204. A spring 226 acts on diaphragm 204 and biases the valve 224 toward closed position. The diaphragm 204 carries a movable contact 228, which co-operates with a stationary contact 230. The arrangement is such that contacts 228 and 230 engage when valve 224 is closed and contacts 220 and 222 engage when valve 216 is closed. Fuel flowing through the valves 214 and 224 flows into a common outlet chamber 230 connected to the conduit 160. The circuit for energizing electromagnet 146 may be traced from the upper terminal of battery 148 through a conductor 232, contacts 222 and 220, a conductor 234, contacts 228 and 230, a conductor 236, electromagnet 146, and conductor 154 to the lower terminal of battery 148.

*Operation of Figure 3*

When the fuel pressure differential is in the idling range, the valve 224 is held closed by its spring 226, and the valve 216 is held open by its spring 218. At the same time, the electromagnet circuit is open because of the separation of contacts 220 and 222. The fuel metering restriction 161 is therefore open to the flow of fuel, and the ignition timing is in its normal position, since electromagnet 146 is de-energized.

As the fuel pressure differential increases, the spring 218 is compressed, and the valve 216 gradually closes. When it closes, the contacts 220 and 222 engage. The fuel-air ratio is thereby increased by the cutting off of the flow through restriction 161. At the same time, the ignition timing is advanced by energization of electromagnet 146.

The spring 226 is made somewhat stronger than spring 218, so that after the valve 216 is closed, the fuel pressure differential must increase by a substantial amount before the valve 224 starts to open. There is thus provided a wide range of fuel pressure differentials, and hence of power outputs, during which there is no change in the fuel-air ratio or in the ignition timing. When the fuel pressure differential exceeds the value necessary to overcome spring 226, valve 224 opens, and at the same time the contacts 228 and 230 are separated. The fuel-air ratio is thereby again increased, since metering restriction 161 is again open to the flow of fuel, and at the same time the ignition timing is returned to normal through the energization of electromagnet 146.

As in the case of Figure 1, if the manual mixture control is moved to its rich position, the pressure d'fferential acting on the diaphragms 202 and 204 is equalized, so that valve 224 is closed and valve 216 is opened, and contacts 220 and 222 are separated. The fuel flow through metering restriction 161 is thereby again permitted, and the ignition timing is changed to normal by the energization of electromagnet 146.

The terms and expressions which I have employed are used as terms of description and not of limitation, and I have no intention, in the use of such terms and expressions, of excluding any equivalents of features shown and described or portions thereof, but recognize that various modifications are possible within the scope of the invention claimed.

I claim as my invention:

1. Control apparatus for an internal combustion engine, comprising a conduit for fuel flowing to said engine, a metering orifice in said conduit, means for regulating the pressure differential across said orifice to control the rate of flow of fuel therethru, valve means connected in parallel with said orifice for controlling the relationship between said fuel pressure differential and said rate of flow, said valve means having an intermediate range of positions in which it is closed and end ranges in which it is open, ignition timing control means having a normal timing positon and an advanced timing position, electrical means for operating said ignition timing control means including switch means, said switch means having an intermediate range of positions in which said switch means operates to cause movement of said ignition timing control means to advanced position and end ranges in which said switch means operates to cause movement of said ignition timing control means to normal position, and operating means for said valve means and said switch means including a single diaphragm subject to said fuel pressure differential and effective to simultaneously move said valve means and said switch means between their respective end ranges and their respective intermediate ranges.

2. Control apparatus for an internal combustion engine, comprising a conduit for fuel flowing to said engine, a metering orifice in said conduit, means for regulating the pressure differential across said orifice to control the rate of flow of fuel therethru, valve means connected in parallel with said orifice for controlling the relationship between said fuel pressure differential and said rate of flow, said valve means having an intermediate range of positions in which it is closed and end ranges in which it is open, ignition tming control means having a normal timing position and an advanced timing position, electrical means for operating said ignition timing control means including switch means, said lever means having an intermediate range of positions in which said switch means operates to cause movement of said ignition timing control means to advanced position and end ranges in which said switch means operates to cause movement of said ignition timing control means to normal position, and operating means for said valve means and said switch means including diaphragm means subject to said fuel pressure differential and effective to simultaneously move said valve means and said switch means between their respective end ranges and their respective intermediate ranges.

3. Control apparatus for an internal combustion engine, comprising a conduit for fuel flowing to said engine, a metering orifice in said conduit, means for regulating the pressure differential across said orifice to control the rate of flow of fuel therethru, a pair of valves connected in parallel with said orifice for controlling the relationship between said fuel pressure differential and said rate of flow, a spring biasing one of said valves open with a predetermined force, another spring biasing the other of said valves closed with a greater force, a pair of diaphragms, each subject to said fuel pressure differential and each acting on one of said valves in opposition to its associated spring, ignition timing control means having a normal timing position and an advanced timing position, and electrical means for operating said ignition timing control means including an electrical circuit and a pair of switches connected in series therein, each said switch being associated with one of said diaphragms and movable thereby to closed position when the valve associated therewith is closed, said electrical means being effective when both switches are closed to cause movement of said ignition timing control means to advanced position and when either switch is open to cause movement of said control means to normal position.

4. Control apparatus for an internal combustion engine, comprising a conduit for fuel flowing to said engine, a metering orifice in said conduit, means for regulating the pressure differential across said orifice to control the rate of flow of fuel therethru, valve means connected in parallel with said orifice for controlling the relationship between said fuel pressure differential and said rate of flow, ignition timing control means having a normal timing position and an advanced timing position, electrical means for operating said ignition timing control means including switch means, and operating means for said valve means and said switch means including a single diaphragm subject to a pressure differential indicative of engine power output and effective to simultaneously close said valve means and operate said switch means to advanced timing position or to simultaneously open said valve means and operate said switch means to normal timing position.

5. Control apparatus for internal combustion engine, comprising a conduit for fuel flowing to said engine, a metering orifice in said conduit, means for regulating the pressure differential across said orifice to control the rate of flow of fuel therethru, ignition timing control means having a normal timing position and an advanced timing position, electrical means for operating said ignition timing control means including switch means, said switch means having an intermediate range of positions in which said switch means operates to cause movement of said ignition timing control means to advanced position and end ranges in which said switch means operates to cause movement of said ignition timing control means to normal position, and operating means for said switch means including a single diaphragm subject to said fuel pressure differential and effective to operate said switch means to its advanced timing position when said pressure differential is in a predetermined intermediate range and to its normal timing position when said pressure differential is outside said range.

6. Control apparatus for an internal combustion engine, comprising ignition timing control means having a normal timing position and an advanced timing position, electrical means for operating said ignition timing control means and effective when energized to move said ignition timing control means to its advanced timing position and when de-energized to move said ignition timing control means to its normal timing position, an electrical circuit including said electrical means and a switch in series, a movable operating member for said switch, said switch comprising a switch lever pivoted near its center on said member, first and second movable contacts, one on each end of said lever, said contacts being located on opposite sides of said lever, first and second stationary contacts mounted adjacent the opposite sides of said lever and adapted to be engaged respectively by said first and second movable contacts, resilient means engaging said lever on one side of said pivot and biasing said lever to carry said first movable contact into engagement with said first stationary contact, said member being effective upon continued movement thereof in one direction to rotate said lever about said first contacts as a fulcrum until said second contacts are engaged and thereafter to rotate said lever about said second contacts as a fulcrum and against the force of said resilient means to disengage said first contacts, said first contacts and said second contacts being connected in series in said circuit so that said circuit is completed only when said first contacts are engaged and said second contacts are engaged, and means responsive to a controlling condition for moving said member.

7. Control apparatus for an internal combustion engine, comprising a conduit for fuel flowing to said engine, a metering orifice in said conduit, means for regulating the pressure differential across said orifice to control the rate of flow of fuel therethru, valve means connected in parallel with said orifice for controlling the relationship between said fuel pressure differential and said rate of flow, said valve means comprising a first valve member, a first seat for said first valve member, means biasing said first valve member into engagement with said seat, a second seat formed on said first valve member, each said valve member and seat together defining a flow path parallel to said orifice, a movable operating member for said valve means, said operating member being effective upon continued movement thereof in one direction first to move said second valve member toward said second valve seat and after engagement of said second valve member with said second seat to act thru said second valve member on said first valve member against said biasing means and move said first valve member away from said first seat, ignition timing control means having a normal timing position and an advanced timing position, electrical means for operating said ignition timing control means and effective when energized to move said ignition timing control means to its advanced timing position and when de-energized to move said ignition timing control means to its normal timing position, an electrical circuit including said electrical means and a switch in series, a movable operating member for said switch, said switch comprising a switch lever pivoted near its center on said member, first and second movable contacts, one on each end of said lever, said contacts being located on opposite sides of said lever, first and second stationary contacts mounted adjacent the opposite sides of said lever and adapted to be engaged respectively by said first and second movable contacts, resilient means engaging said lever on one side of said pivot and biasing said lever to carry said first movable contact into engagement with said first stationary contact, said member being effective upon continued movement thereof in one direction to rotate said lever about said first contacts as a fulcrum until said second contacts are engaged and thereafter to rotate said lever about said second contacts as a fulcrum and against the force of said resilient means to disengage said first contacts, said first contacts and said second contacts being connected in series in said circuit so that said circuit is completed only when said first contacts are engaged and said second contacts are engaged, and means responsive to a controlling condition for moving both said members, said members being so positioned with respect to each other and said condition responsive means that said second valve member engages said second seat simultaneously with engagement of said second contacts.

8. Control apparatus for an internal combustion engine, comprising a conduit for fuel flowing to said engine, a metering orifice in said conduit, means for regulating the pressure differential across said orifice to control the rate of flow of fuel therethru, valve means connected in parallel with said orifice for controlling the relationship between said fuel pressure differential and said rate of flow, said valve means comprising a first valve member, a first seat for said first valve member, means biasing said first valve member into engagement with said seat, a second seat formed on said first valve member, each said valve member and seat together defining a flow path parallel to said orifice, a movable operating member for said valve means, said operating member being effective upon continued movement thereof in one direction first to move said second valve member toward said second valve seat and after engagement of said second valve member with said second seat to act thru said second valve member on said first valve member against said first valve biasing means and move said first valve member away from said first seat, and means responsive to a controlling condition for moving said operating member.

9. Control apparatus for an internal combustion engine, comprising ignition timing control means having a normal timing position and an advanced timing position, electrical means for operating said ignition timing control means and effective when energized to move said ignition timing control means to its advanced timing position and when de-energized to move said ignition timing control means to its normal timing position, an electrical circuit including said electrical means and a switch in series, a movable operating member for said switch, said switch comprising a switch lever pivoted near its center on said member, first and second movable contacts, one on each end of said lever, said contacts being located on opposite sides of said lever, first and second stationary contacts mounted adjacent the opposite sides of said lever and adapted to be engaged respectively by said first and second movable contacts, resilient means engaging said lever on one side of said pivot and biasing said lever to carry said first movable contact into engagement with said first stationary contact, said member being effective upon continued movement thereof in one direction to rotate said lever about said first contacts as a fulcrum until said second contacts are engaged and thereafter to rotate said lever about said second contacts as a fulcrum and against the force of said resilient means to disengage said first contacts, said first contacts and said second contacts being connected in series in said circuit so that said circuit is completed only when said first contacts are engaged and said second contacts are engaged, means responsive to a variable controlling condition for producing a variable operating force acting on said member, and spring means opposing said condition responsive means, said condition responsive means being effective as said force increases to close said second contacts when said force reaches a predetermined value, then to hold both sets of contacts engaged until said force increases to a higher value sufficient to overcome both said resilient means and said spring means, and thereupon to open said first contacts.

10. Control apparatus for an internal combustion engine, comprising a conduit for fuel flowing to said engine, a metering orifice in said conduit, means for regulating the pressure differential across said orifice to control the rate of flow of fuel therethru, valve means connected in parallel with said orifice for controlling the relationship between said fuel pressure differential and said rate of flow, said valve means comprising a first valve member, a first seat for said first valve member, means biasing said first valve member into engagement with said seat, a second seat formed on said first valve member on the side opposite said biasing means, each said valve member and seat together defining a flow path parallel to said orifice, a movable operating member for said valve means, said operating member being effective upon continued movement thereof in one direction first to move said second valve member toward said second valve seat and after engagement of said second valve member with said second seat to act thru said second valve member on said first valve member against said biasing means and move said first valve member away from said first seat, ignition timing control means having a normal timing position and an advanced timing position, electrical means for operating said ignition timing control means and effective when energized to move said ignition timing control means to its advanced timing position and when de-energized to move said ignition timing control means to its normal timing position, an electrical circuit including said electrical means and a switch in series, a movable operating member for said switch, said switch comprising a switch lever pivoted near its center on said member, first and second movable contacts, one on each end of said lever, said contacts being located on opposite sides of said lever, first and second stationary contacts mounted adjacent the opposite sides of said lever and adapted to be engaged respectively by said first and second movable contacts, resilient means engaging said lever on one side of said pivot and biasing said lever to carry said first movable contact into engagement with said first stationary contact, said member being effective upon continued movement thereof in one direction to rotate said lever about said first contacts as a fulcrum until said second contacts are engaged and thereafter to rotate said lever about said second contacts as a fulcrum and against the force of said resilient means to disengage said first contacts, said first contacts and said second contacts being connected in series in said circuit so that said circuit is completed only when said first contacts are engaged and said second contacts are engaged, means responsive to a variable controlling condition for producing a variable operating force acting on both said operating members, said members being so positioned with respect to each other and said condition responsive means that said second valve member engages said second seat simultaneously with engagement of said second contacts, and spring means opposing said condition responsive means, said condition responsive means being effective as said force increases to close said second contacts and to close said second valve member on its seat when said force reaches a predetermined value, then to hold both sets of contacts engaged and both first and second valve members on their seats until said force increases to a higher value sufficient to overcome said resilient means, said biasing means and said spring means, and thereupon to open said first contacts and move said first valve member off its seat.

11. Control apparatus for an internal combustion engine, comprising a conduit for fuel flowing to said engine, a metering orifice in said conduit, means for regulating the pressure differential across said orifice to control the rate of flow of fuel therethru, valve means connected in parallel with said orifice for controlling the relationship between said fuel pressure differential and said rate of flow, said valve means comprising a first valve member, a first seat for said first valve member, means biasing said first valve member into engagement with said seat, a second seat formed on said first valve member on the side opposite said biasing means, each said valve member and seat together defining a flow path parallel to said orifice, a movable operating member for said valve means, said operating member being effective upon continued movement thereof in one direction first to move said second valve member toward said second valve seat and after engagement of said second valve member with said second seat to act thru said second valve member on said first valve member against said biasing means and move said first valve member away from said first seat, means responsive to a variable controlling condition for producing a variable operating force acting on said operating member, and spring means opposing said condition responsive means, said condition responsive means being effective as said force increases to move said second valve member into engagement with said second seat when said force reaches a predetermined value, then to hold both first and second valve members on their seats until said force increases to a higher value sufficient to overcome said biasing means and said spring means, and thereupon to move said first valve member off its seat.

MILTON E. CHANDLER.

REFERENCES CITED

The following references are of record in the file of this patent:

UNITED STATES PATENTS

| Number | Name | Date |
|---|---|---|
| 2,378,037 | Reggio | June 12, 1945 |
| 2,390,166 | Parkins et al. | Dec. 4, 1945 |